J. A. BALZART.
Churn.
No. 58,047.
Patented Sept. 18, 1866.
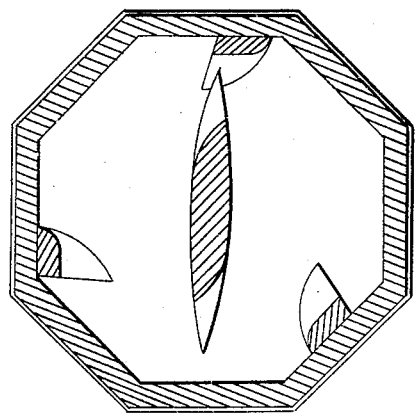
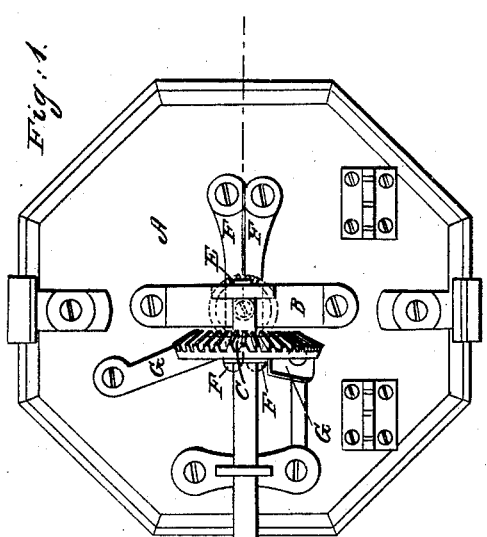
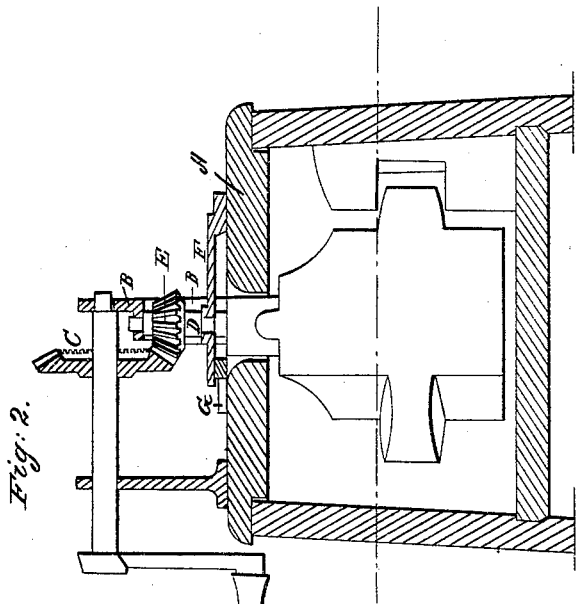

UNITED STATES PATENT OFFICE.

JOHN A. BALZART, OF PIQUA, OHIO.

IMPROVEMENT IN CHURNS.

Specification forming part of Letters Patent No. 58,047, dated September 18, 1866.

*To all whom it may concern:*

Be it known that I, JOHN A. BALZART, of Piqua, in the county of Miami and State of Ohio, have invented a new and Improved Churn; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a plan view of the apparatus for locking around the stem or shaft of the dasher. Fig. 2 is a sectional view.

The improvement is adapted to a churn in which the dasher is suspended from the lid.

It consists in a locking arrangement of two pivoted arms which inclose a circular groove in the shaft, forming a collar, the arms being retained in their locked position by a slide.

In the drawings, A is the lid of the churn; B, the bridge which supports the master-wheel C, and into which the upper pintle of the dasher-shaft D is journaled. E is the pinion on the dasher-shaft, by which it is rotated, and F F are arms which are pivoted to the lid, being opened to receive the dasher and closed upon it, occupying the circular groove to support it when in position for work.

To prevent the spreading apart of the arms F F by the lateral motion of the dasher a slide, G, is provided, which, binding against the outside edges of the arms, keeps them closed, as shown in Fig. 1.

The suspended dasher requires no pintle at its lower end, and is readily freed from the churn by unlocking the arms F F and lifting the lid, which may have doors for the introduction of the milk or cream and warm or cold water to modify the temperature.

Having described my invention, what I claim as new, and desire to secure by Letters Patent, is—

The combination, with the suspended dasher, of the pivoted arms F F, forming a collar in the groove of the shaft D, and the slide G, for retaining the said collar in position, substantially as described.

JOHN A. BALZART.

Witnesses:
 THOS. L. DANIELS,
 STEPHEN GENSLINGER.